(12) United States Patent
Kodera et al.

(10) Patent No.: US 10,884,216 B2
(45) Date of Patent: Jan. 5, 2021

(54) METHOD OF MANUFACTURING AN OPTICAL MULTIPLEXER

(71) Applicant: MITSUBISHI ELECTRIC CORPORATION, Tokyo (JP)

(72) Inventors: Hidekazu Kodera, Tokyo (JP); Masaya Shimono, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 417 days.

(21) Appl. No.: 15/555,335

(22) PCT Filed: Mar. 1, 2016

(86) PCT No.: PCT/JP2016/056241
§ 371 (c)(1),
(2) Date: Sep. 1, 2017

(87) PCT Pub. No.: WO2016/140220
PCT Pub. Date: Sep. 9, 2016

(65) Prior Publication Data
US 2018/0039034 A1 Feb. 8, 2018

(30) Foreign Application Priority Data

Mar. 5, 2015 (JP) .................................. 2015-043727

(51) Int. Cl.
*H05K 3/30* (2006.01)
*G02B 7/182* (2006.01)
*G02B 6/42* (2006.01)

(52) U.S. Cl.
CPC ........... *G02B 7/182* (2013.01); *G02B 6/4236* (2013.01); *Y10T 29/4913* (2015.01)

(58) Field of Classification Search
CPC .. G02B 6/2938; G02B 6/29367; G02B 27/30; G02B 27/283; G02B 7/003; H04J 14/02;
(Continued)

(56) References Cited

U.S. PATENT DOCUMENTS 7,092,587 B1 8/2006 Denis
8,303,195 B2 * 11/2012 Adachi ................ G02B 6/4204
385/73
(Continued)

FOREIGN PATENT DOCUMENTS

CN 101442185 A 5/2009
JP 2002-040283 A 2/2002
(Continued)

OTHER PUBLICATIONS

Office Action (Notification of Reasons for Refusal) dated May 29, 2018, by the Japanese Patent Office in corresponding Japanese Patent Application No. 2017-503662 and English translation of the Office Action. (7 pages).
(Continued)

*Primary Examiner* — Thiem D Phan
(74) *Attorney, Agent, or Firm* — Buchanan Ingersoll & Rooney PC

(57) ABSTRACT

The present invention relates to a manufacturing method for an optical multiplexer provided with: a substrate having a first main surface and a second main surface that are parallel to each other; a mirror disposed on the first main surface; and an optical filter disposed on the second main surface. This method includes: a step for placing the mirror on the first main surface of the substrate, performing angular adjustment between the substrate and the mirror using an autocollimator, and then fixing the mirror to the substrate; and a step for placing the optical filter on the second main surface of the substrate, performing angular adjustment between the substrate and the optical filter using the autocollimator, and then fixing the optical filter to the substrate.

2 Claims, 12 Drawing Sheets

(58) Field of Classification Search
CPC .......... H04J 14/00; G21K 1/02; G01J 1/0488; Y10T 428/24479; Y10T 29/4913
USPC ........ 29/832, 407.01, 407.05, 428, 464, 593
See application file for complete search history.

(56) References Cited

U.S. PATENT DOCUMENTS

| | | | |
|---|---|---|---|
| 9,285,544 B2* | 3/2016 | Panotopoulos | G02B 6/4231 |
| 2006/0222042 A1 | 10/2006 | Teramura et al. | |
| 2009/0103923 A1 | 4/2009 | Hosomi et al. | |
| 2011/0013869 A1 | 1/2011 | Pezeshki et al. | |
| 2011/0280514 A1 | 11/2011 | Omura et al. | |

FOREIGN PATENT DOCUMENTS

| | | |
|---|---|---|
| JP | 2006-267325 A | 10/2006 |
| JP | 2006-284851 A | 10/2006 |
| JP | 2006-323347 A | 11/2006 |
| JP | 2007-333772 A | 12/2007 |
| JP | 2008-276183 A | 11/2008 |
| JP | 2009-105106 A | 5/2009 |
| JP | 2010-175875 A | 8/2010 |
| JP | 2011-209367 A | 10/2011 |
| WO | WO 2010/140185 A1 | 12/2010 |

OTHER PUBLICATIONS

Xu Zui Ling et al., "A text book for adjusting a measuring device", Tsinghua University, Sep. 30, 2009, pp. 68-72 and with English translation. (total pp. 10).
Office Action dated Jan. 30, 2019, by the Chinese Patent Office in corresponding Chinese Patent Application No. 201680009842.0 and English translation of the Office Action. (14 pages).
Notification of Transmittal of Translation of the International Preliminary Report on Patentability (Forms PCT/IB/338 and PCT/IB/373) and the Written Opinion of the International Searching Authority (Form PCT/ISA/237) dated Sep. 14, 2017, by the International Bureau of WIPO in corresponding International Application No. PCT/JP2016/056241. (9 pages).
International Search Report (PCT/ISA/210) dated Jun. 7, 2016, by the Japanese Patent Office as the International Searching Authority for International Application No. PCT/JP2016/056241.
Written Opinion (PCT/ISA/237) dated Jun. 7, 2016, by the Japanese Patent Office as the International Searching Authority for International Application No. PCT/JP2016/056241.

* cited by examiner

LIGHT BEAM POSITIONALLY DISPLACED ← OPTICAL FILTER ANGULARLY MISALIGNED

METHOD OF MANUFACTURING AN OPTICAL MULTIPLEXER

TECHNICAL FIELD

The present invention relates to a manufacturing method and a manufacturing apparatus for an optical multiplexer included in an integrated optical module or the like.

RELATED ART

Increase in optical network communication traffic in recent years requires smaller optical modules with higher communication capability and lower power consumption. Such optical modules have been integrated for reduction in size and decrease in power consumption. For example, Patent Document 1 described below discloses an optical integration module including, in a single package, four optical devices having different wavelengths and an optical multiplexer, which are optically coupled by lenses. This optical integration module needs to package these constituents with less optical loss variation, among the four optical devices, of beams emitted from the optical devices and received by the optical multiplexer.

In order to achieve this, Patent Document 2 described below proposes transmitting external operation electric signals to a beam redirecting unit including a nonlinear optical device or the like and disposed between a lens and an optical multiplexer to redirect passing signal light beams by wavelengths and decrease optical loss variation between optical devices. This method needs the nonlinear optical device causing increase in cost and difficulty in size reduction. The method also needs external transmission of the electric signals, which causes increase in power consumption of a module.

In an optical integration module, an optical multiplexer having an optical multiplexing function needs to be assembled highly accurately and be set to concentrate beams emitted from a plurality of optical devices at one point.

In order to achieve this, Patent Document 3 described below discloses a transparent block provided therein with filter layers. However, provision of a plurality of filter layers having different properties will increase the manufacture cost.

CITATIONS LIST

Patent Documents

Patent Document 1: US 2011/0013869 A (FIG. 1)
Patent Document 2: JP 2010-175875 A (FIG. 1)
Patent Document 3: JP 2002-40283 A (FIG. 6)

SUMMARY OF INVENTION

Problems to be Solved by the Invention

It is an object of the present invention to provide a manufacturing method and a manufacturing apparatus for an optical multiplexer having an optical multiplexing function, which achieve highly accurate assembly.

Means For Solving the Problems

In order to achieve the object mentioned above, the present invention provides a method of manufacturing an optical multiplexer including a substrate having a first main surface and a second main surface parallel to each other, a mirror disposed on the first main surface, and an optical filter disposed on the second main surface, the method including the steps of: mounting the mirror on the first main surface of the substrate, angularly adjusting the mirror with respect to the substrate with use of an autocollimator, and then fixing the mirror to the substrate; and mounting the optical filter on the second main surface of the substrate, angularly adjusting the optical filter with respect to the substrate with use of the autocollimator, and then fixing the optical filter to the substrate.

The present invention also provides a method of manufacturing an optical multiplexer including a substrate having a first main surface and a second main surface parallel to each other, a mirror disposed on the first main surface, and an optical filter disposed on the second main surface, the method including the steps of: mounting the substrate on a reference surface of a workpiece table; irradiating the reference surface with a light beam and measuring a reflection direction of the light beam reflected at the reference surface to obtain an angle θa of the reference surface; mounting the mirror on the first main surface of the substrate; irradiating the mirror with a light beam and measuring a reflection direction of the light beam reflected at the mirror to obtain an angle θb of the mirror; angularly adjusting the mirror to cause the angle θb to be equal to the angle θa, and then fixing the mirror to the substrate; mounting the inverted substrate on the reference surface of the workpiece table; mounting the optical filter on the second main surface of the substrate; irradiating the second main surface of the substrate with a light beam and measuring a reflection direction of the light beam reflected at the second main surface to obtain an angle θc of the second main surface; irradiating the optical filter with a light beam and measuring a reflection direction of the light beam reflected at the optical filter to obtain an angle θd of the optical filter; and angularly adjusting the optical filter to cause the angle θc to be equal to the angle θd, and then fixing the optical filter to the substrate.

The present invention further provides an apparatus configured to manufacture an optical multiplexer including a substrate having a first main surface and a second main surface parallel to each other, a mirror disposed on the first main surface, and an optical filter disposed on the second main surface, the apparatus including: a workpiece table allowing the optical multiplexer to be assembled thereon; a light beam irradiation angle measuring unit configured to measure relative angles among a reference surface of the workpiece table, the substrate, the mirror, and the optical filter; an angle adjuster configured to angularly adjust the mirror and the optical filter with respect to the substrate; and a component fixer configured to fix the mirror and the optical filter to the substrate.

Effects of the Invention

The present invention allows the mirror and the optical filter to be fixed at precise angles to the substrate, to achieve the highly accurate optical multiplexer. Optical axis alignment can thus be performed easily upon assembling the obtained optical multiplexer in a small optical integration module, which causes less optical loss variation.

BRIEF DESCRIPTION OF THE DRAWINGS

FIG. 2(a) is a front view from optical filters, FIG. 2(b) is a plan view from above, and FIG. 2(c) is a rear view from a mirror.

EMBODIMENTS OF THE INVENTION

First Embodiment

Figure 1:
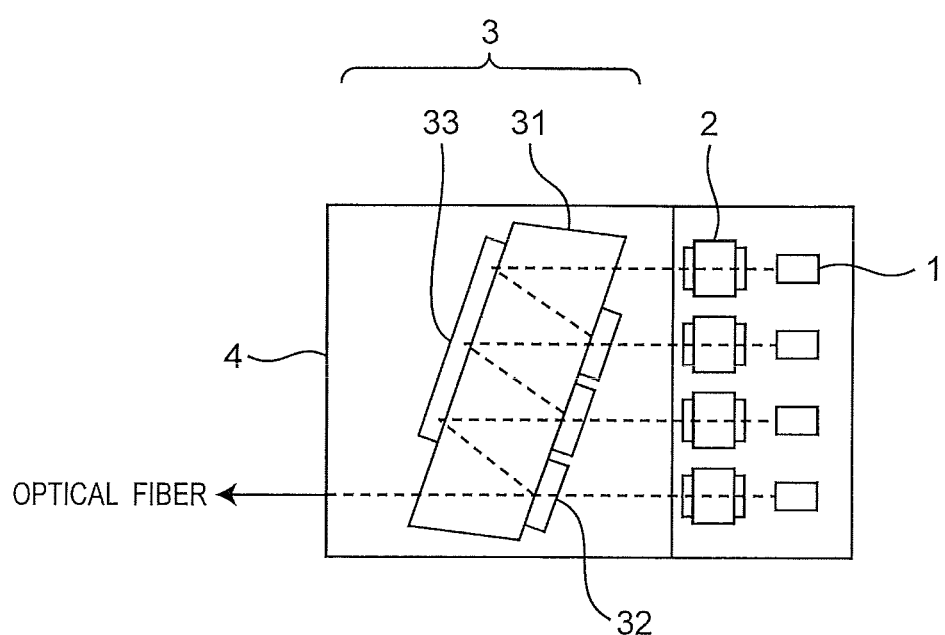
FIG. 1 is a configuration diagram of an exemplary optical system of an optical integration module to which the present invention is applicable.

FIG. 1 is a configuration diagram of an exemplary optical system of an optical integration module to which the present invention is applicable. The optical integration module has a function of simultaneously transmitting an optical signal via a plurality of communication channels in a wavelength division multiplex mode or the like. Exemplified herein are four communication channels, while two to three or at least five communication channels can be configured similarly.

The optical integration module includes four optical devices 1, four lenses 2, an optical multiplexer 3 configured to optically synthesize beams from the optical devices 1, a basal plate 4, and the like.

Each of the optical devices 1 includes a semiconductor laser, a solid-state laser, or the like, and is configured to generate a beam having a center wavelength different from one another (1300 nm to 1500 nm) in an exemplary wavelength-division multiplex mode. The optical devices 1 are joined onto a submount (not depicted) by soldering, with an adhesive agent, or the like, and the submount is fixed onto the basal plate 4 by soldering, with an adhesive agent, or the like. The optical devices 1 are connected with a driving circuit, a modulation circuit, and the like and are each configured to generate a light pulse high-speed modulated in accordance with an external digital signal.

The lenses 2 convert laser beams emitted from the optical devices 1 to parallel beams, respectively. The parallelized laser beams enter the optical multiplexer 3.

The optical multiplexer 3 includes a substrate 31 having a first main surface and a second main surface parallel to each other, a mirror 33 disposed on the first main surface, and optical filters 32 disposed on the second main surface. The mirror 33 and the optical filters 32 are joined to the substrate 31 with an optical adhesive agent. The optical filters 32 are band pass filters each configured to allow only light having a wavelength equal to a center wavelength of a laser beam emitted from a corresponding one of the optical devices 1 and reflect light having different wavelengths.

As to the function of the optical multiplexer 3, a laser beam emitted from the first optical device 1 at the upper most position in FIG. 1 passes through the corresponding lens 2, is reflected at the mirror 33, the optical filter 32, the mirror 33, the optical filter 32, the mirror 33, and the optical filter 32 in the mentioned order, and enters a subsequent optical fiber (not depicted). A laser beam emitted from the second optical device 1 from the top passes through the corresponding lens 2 and the optical filter 32, is then reflected at the mirror 33, the optical filter 32, the mirror 33, and the optical filter 32 in the mentioned order, and enters the subsequent optical fiber. A laser beam emitted from the third optical device 1 from the top passes through the corresponding lens 2 and the optical filter 32, is then reflected at the mirror 33 and the optical filter 32 in the mentioned order, and enters the subsequent optical fiber. A laser beam emitted from the fourth optical device 1 from the top passes through the corresponding lens 2 and the optical filter 32, and then enters the subsequent optical fiber. Laser beams emitted from the optical devices 1 are multiplexed to have a single optical axis so as to be transmitted with the single optical fiber.

Figure 2:
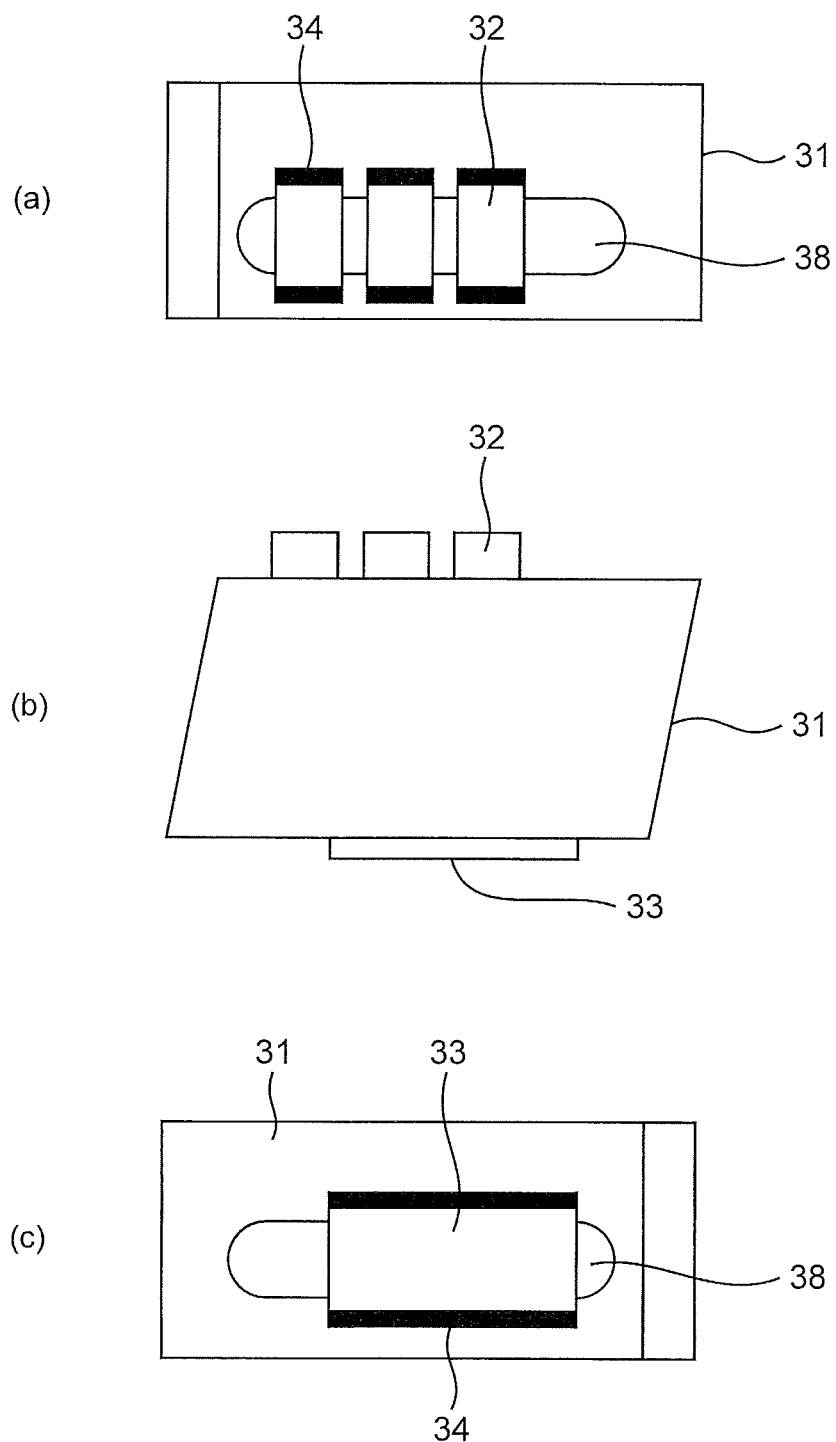
FIGS. 2(a) to 2(c) are configuration diagrams of an exemplary optical multiplexer, and specifically.

FIGS. 2(a) to 2(c) are exemplary configuration diagrams of the optical multiplexer 3, and specifically, FIG. 2(a) is a front view from the optical filters 32, FIG. 2(b) is a plan view from above, and FIG. 2(c) is a rear view from the mirror 33. The substrate 31 has a hollow parallelepiped shape, and is provided, at a front surface and a rear surface, with oval windows 38. The optical filters 32 and the mirror 33 are disposed to stride over the windows 38 and are joined to the substrate 31 with an adhesive agent 34. Such bridge joint prevents interference between the substrate 31 and laser beams passing the optical multiplexer 3.

Figure 3:
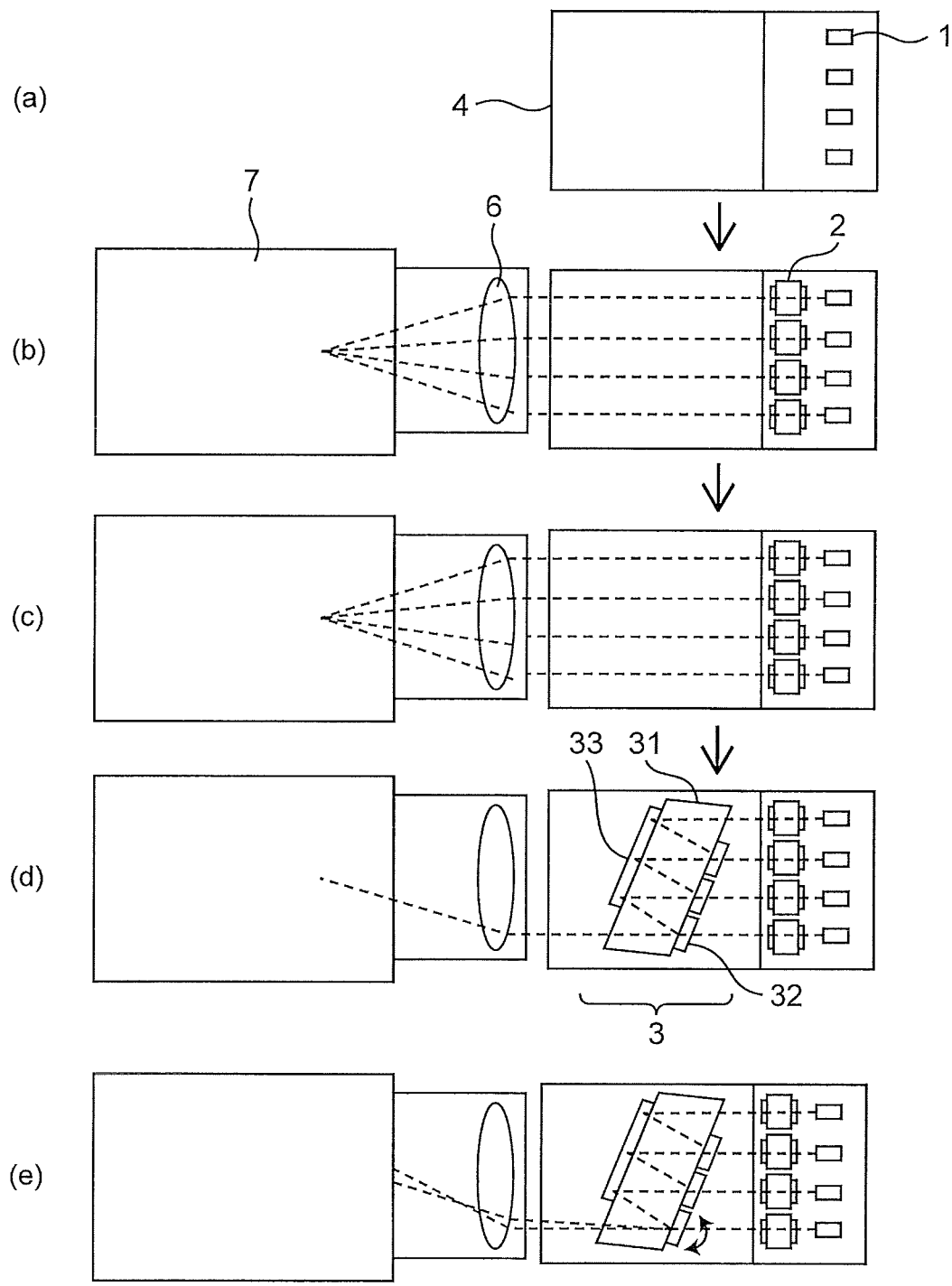
FIGS. 3(a) to 3(e) are explanatory views of an exemplary procedure of assembling the optical system of the optical integration module.

FIGS. 3(a) to 3(e) are explanatory views of an exemplary procedure of assembling the optical system of the optical integration module. As depicted in FIG. 3(a), the basal plate 4 is initially prepared, to which the optical devices 1 are joined. As depicted in FIG. 3(b), the lenses 2 are subsequently disposed on the basal plate 4 correspondingly to the optical devices 1, and the lenses 2 are positionally adjusted to allow light beams emitted from the optical devices 1 to become collimate beams. A position of four concentrated light beams is checked with use of a zoom lens 6 and an imaging camera 7. As depicted in FIG. 3(c), the lenses 2 having been positionally adjusted are then fixed to the basal plate 4 by soldering, with an adhesive agent, by welding, or the like.

As depicted in FIG. 3(d), the optical multiplexer 3 depicted in FIG. 1 is then inserted between the lenses 2 and the zoom lens 6 and is positionally adjusted to allow four light beams to be concentrated to a single light beam. If the optical multiplexer 3 is assembled accurately, the optical multiplexer 3 has only to be collectively positionally adjusted.

If the optical multiplexer 3 is not assembled with sufficient accuracy, in other words, if the plurality of optical filters 32 and the mirror 33 are not parallel to each other in the optical multiplexer, particularly if the optical filters 32 are angularly misaligned, light beams are positionally displaced. In this case, it is insufficient to collectively positionally adjust the optical multiplexer 3. The preliminarily fixed lenses 2 are inevitably positionally adjusted again, which is an extra task. Assembly of an optical integration module thus needs preliminary preparation of the optical multiplexer 3 of high accuracy.

Figure 4:
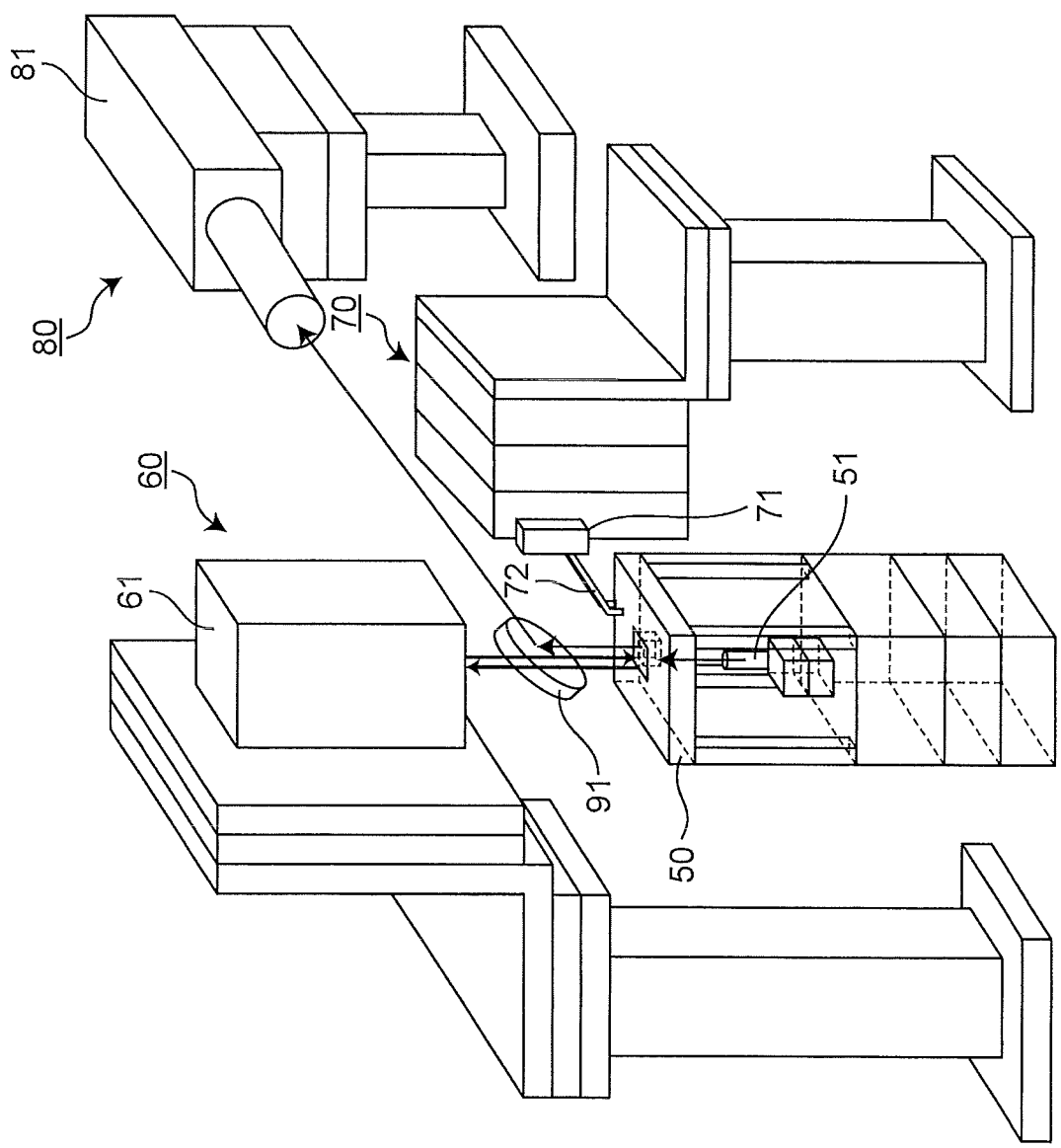
FIG. 4 is a perspective view of an exemplary apparatus configured to manufacture an optical multiplexer according a first embodiment of the present invention.
Figure 5:
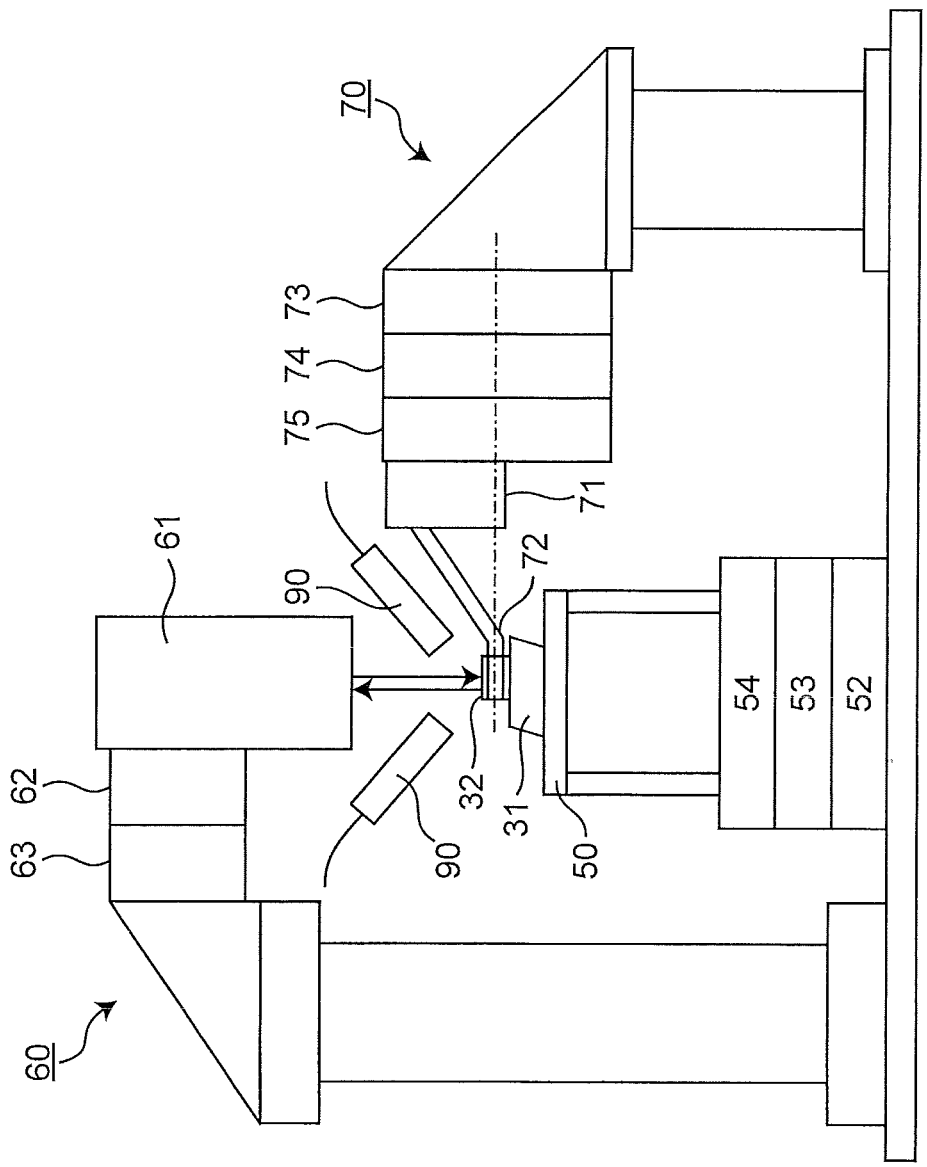
FIG. 5 is a front view of the exemplary apparatus configured to manufacture the optical multiplexer according the first embodiment of the present invention.

FIG. 4 is a perspective view of an exemplary manufacturing apparatus for the optical multiplexer according the first embodiment of the present invention, and FIG. 5 is a front view thereof. The manufacturing apparatus for the optical multiplexer mainly includes a workpiece table 50 allowing the optical multiplexer to be assembled thereon, a light beam irradiation angle measuring unit 60 configured to measure relative angles among a reference surface of the workpiece table 50, the substrate 31 of the optical multiplexer, the mirror 33, and the optical filters 32, an angle adjuster 70 configured to adjust angles of the mirror 33 and the optical filters 32 with respect to the substrate 31, and a component fixer fixing the mirror 33 and the optical filters 32 to the substrate 31.

The workpiece table 50 mainly includes a work stage having a horizontal reference surface, and various shiftable stages supporting the work stage, such as an XY axis stage 52, a rotary stage 53 about a Z axis, and a biaxial gonio stage 54 slanted about X and Y axes.

The light beam irradiation angle measuring unit 60 mainly includes an autocollimator 61, and various shiftable stages supporting the autocollimator 61, such as a rotary stage 62 about the Y axis and a Z axis (vertical) stage 63.

The angle adjuster 70 mainly includes a component gripping mechanism 71 having a gripping hand 72 configured to grip optical components such as the mirror 33 and the optical filters 32, and various shiftable stages supporting the component gripping mechanism 71, such as a Z axis (vertical) stage 73, a rotary stage 74 about the Y axis, and a biaxial gonio stage 75 slanted about the X and Y axes.

The component fixer mainly includes an adhesive applying mechanism (not depicted) like a dispenser, configured to apply an adhesive agent such as a UV curing resin, and a light guide 90 used upon irradiating the applied adhesive agent with UV light.

The manufacturing apparatus for the optical multiplexer preferably includes a light beam position measuring unit configured to irradiate the completed optical multiplexer with a test light beam and positionally measure a light beam outputted from the optical multiplexer. The light beam position measuring unit mainly includes a reference light source 51 configured to generate a test light beam toward the optical multiplexer, a mirror 91 reflecting a light beam outputted from the optical multiplexer, and an imaging camera unit 80 configured to image a light beam reflected by the mirror 91. The imaging camera unit 80 mainly includes an imaging camera 81, an imaging lens 82, and various shiftable stages supporting the imaging camera 81, such as an XY axis stage 83 and a Z axis stage 84 (see FIGS. 7(a) to 7(c)). The mirror 91 includes a mechanism configured to retreat from an optical path while the autocollimator 61 is in use.

The manufacturing apparatus thus has at least two functions, specifically, the first function of highly accurately assembling the mirror 33 and the optical filters 32 in accordance with angles measured by the light beam irradiation angle measuring unit 60 including the autocollimator 61, and the second function of irradiating the optical multiplexer with a light beam from the reference light source 51 and surveying assembly accuracy of the optical multiplexer with use of the imaging camera 81.

Figure 6:
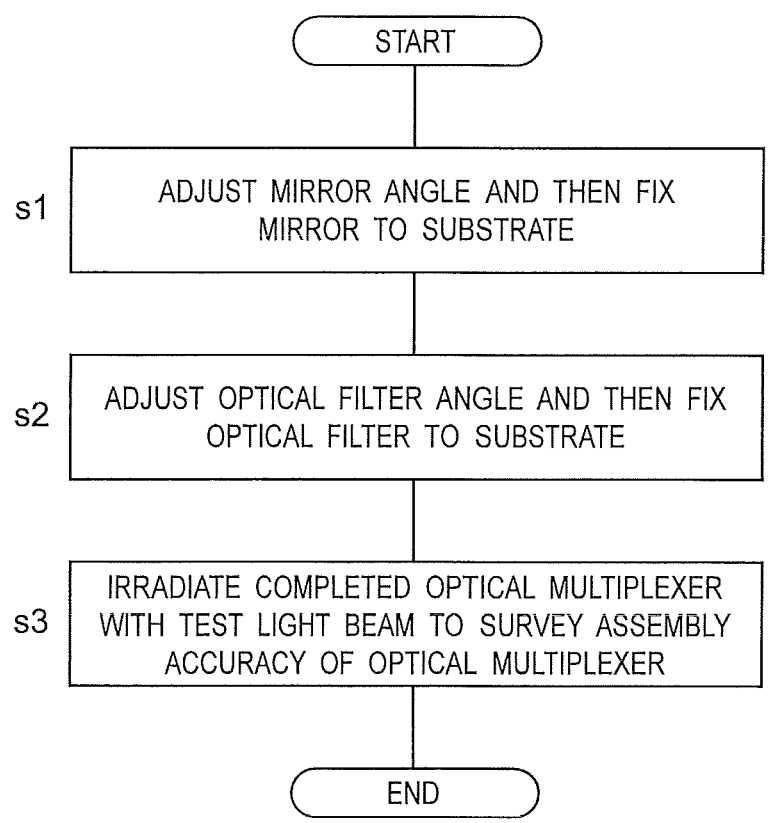
FIG. 6 is a flowchart of an exemplary method of manufacturing the optical multiplexer according the first embodiment of the present invention.
Figure 7:
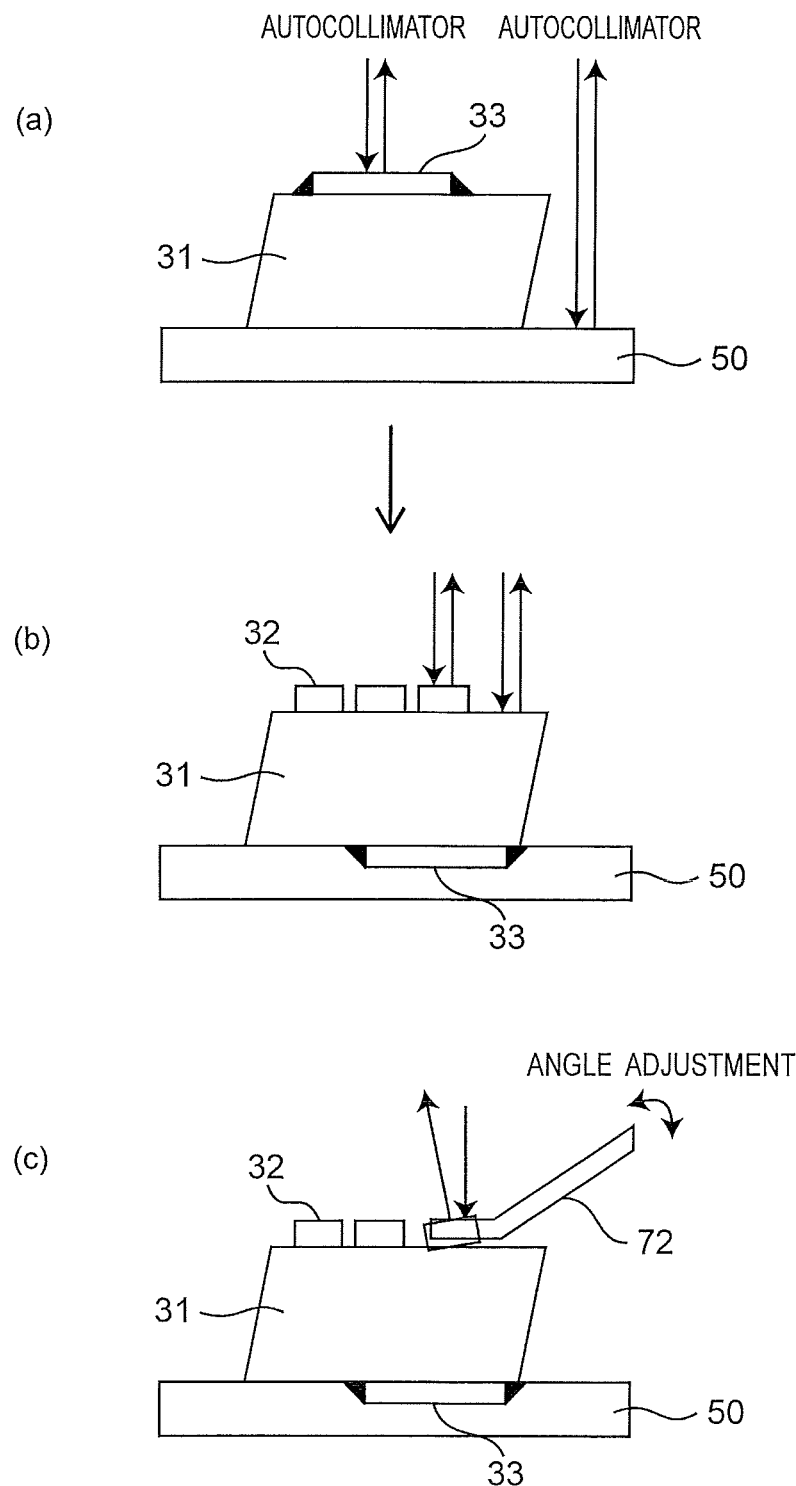
FIGS. 7(a) to 7(c) are explanatory views of the exemplary method of manufacturing the optical multiplexer according the first embodiment of the present invention.

FIG. 6 is a flowchart of an exemplary method of manufacturing the optical multiplexer according the first embodiment of the present invention, and FIGS. 7(a) to 7(c) are explanatory views thereof. Initially in step s1, the substrate 31 is mounted on the reference surface of the workpiece table 50 as depicted in FIG. 7(a). The reference surface is subsequently irradiated with a light beam and a reflection direction of the light beam reflected at the reference surface is measured with use of the autocollimator 61 to obtain an angle θa of the reference surface. In this case, the biaxial gonio stage 54 can be driven to adjust the angle of the reference surface such that the light beam reflected at the reference surface passes through a reference point of the autocollimator 61.

The mirror 33 is subsequently mounted on the first main surface of the substrate 31. The mirror 33 is then irradiated with a light beam and a reflection direction of the light beam reflected at the mirror 33 is measured with use of the autocollimator 61 to obtain an angle θb of the mirror 33. The angle of the mirror 33 is then adjusted with use of the gripping hand 72 such that the angle θb becomes equal to the angle θa. Angular measurement with the autocollimator 61 and angular adjustment with the gripping hand 72 can be performed repeatedly in this case. The mirror 33 is then fixed to the substrate 31 by application of an adhesive agent or UV light irradiation with use of the component fixer.

Subsequently in step s2, the substrate 31 vertically inverted is mounted on the reference surface of the workpiece table 50 as depicted in FIG. 7(b). The workpiece table 50 is provided with an escape space so as not to come into contact with the fixed mirror 33. The optical filters 32 are then mounted on the second main surface of the substrate 31. The second main surface of the substrate 31 is subsequently irradiated with a light beam and a reflection direction of the light beam reflected at the second main surface is measured with use of the autocollimator 61 to obtain an angle θc of the second main surface. In this case, the biaxial gonio stage 54 can be driven to adjust the angle of the second main surface such that the light beam reflected at the second main surface passes through the reference point of the autocollimator 61.

Each of the optical filters 32 is subsequently irradiated with a light beam and a reflection direction of the light beam reflected at the optical filter 32 is measured with use of the autocollimator 61 to obtain an angle θd of the optical filter 32. As depicted in FIG. 7(c), the angle of the optical filter 32 is then adjusted with use of the gripping hand 72 such that the angle θc becomes equal to the angle θd. Angular measurement with the autocollimator 61 and angular adjustment with the gripping hand 72 can be performed repeatedly in this case. The optical filters 32 are then fixed to the substrate 31 by application of an adhesive agent or UV light irradiation with use of the component fixer.

Subsequently in step s3, the completed optical multiplexer is irradiated with a test light beam for survey of assembly accuracy of the optical multiplexer.

Figure 8:
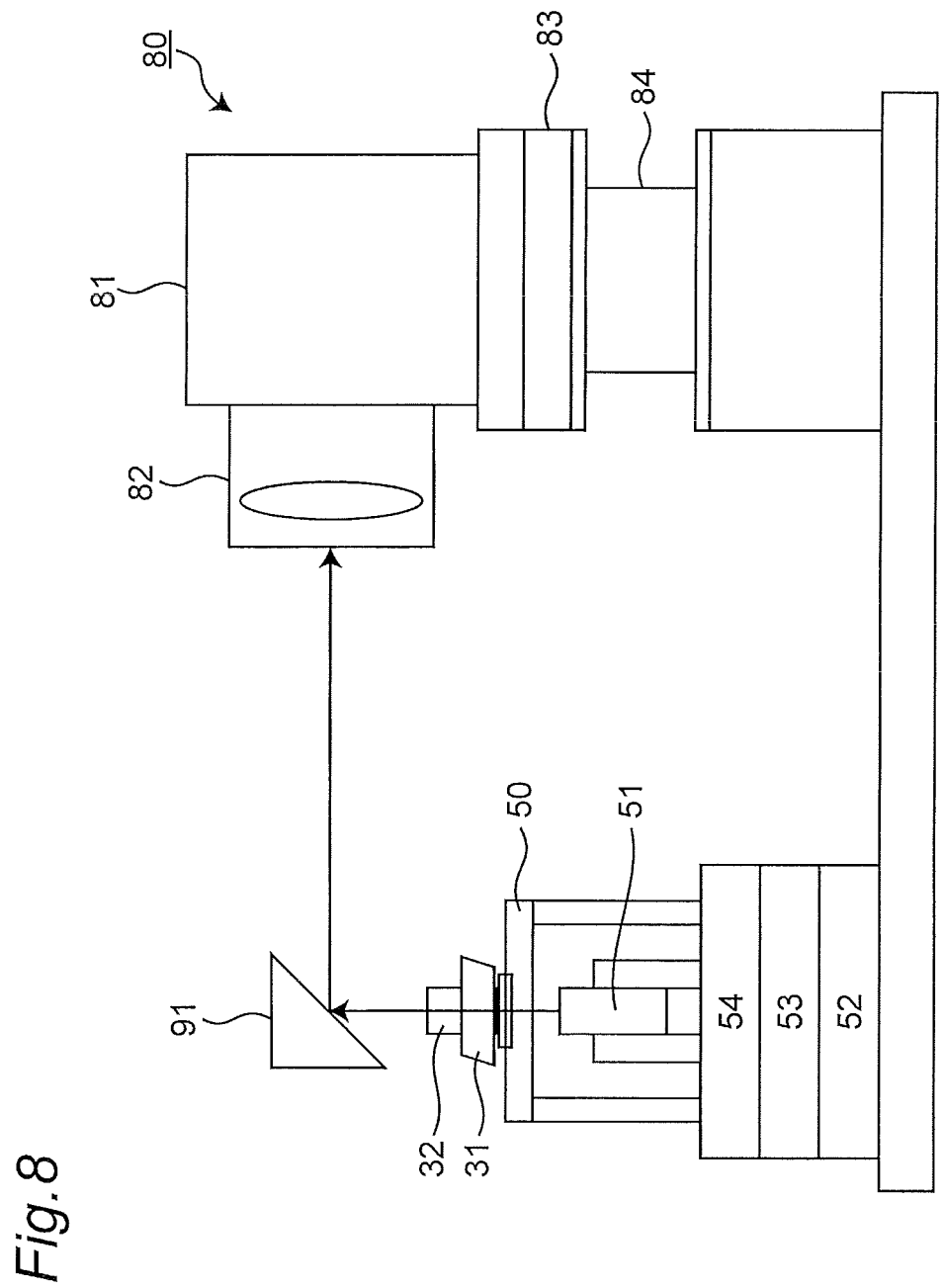
FIG. 8 is an explanatory view of an exemplary technique of surveying assembly accuracy of an optical multiplexer.
Figure 9:
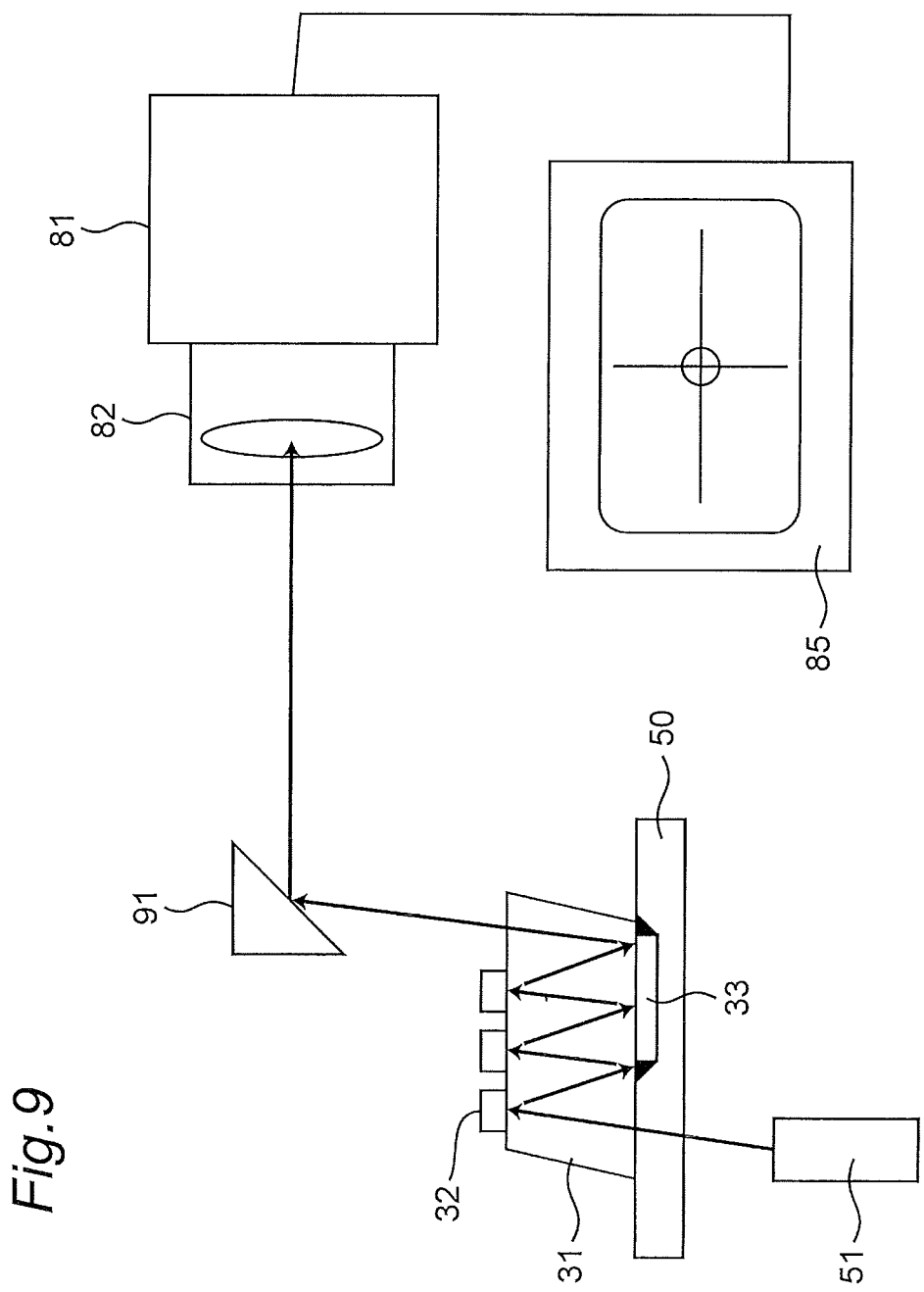
FIG. 9 is an explanatory view of the exemplary technique of surveying assembly accuracy of the optical multiplexer.

FIGS. 8 and 9 are explanatory views of an exemplary technique of surveying assembly accuracy of an optical multiplexer. The optical multiplexer thus completed is irradiated with a test light beam from the reference light source 51, and a light beam outputted from the optical multiplexer is positionally measured with use of the imaging camera 81. A light beam image obtained by the imaging camera 81 is displayed on a screen of a monitor 85, and assembly accuracy of the optical multiplexer can be checked in accordance with whether or not the position of the beam is out of a predetermined allowable range.

Figure 10:
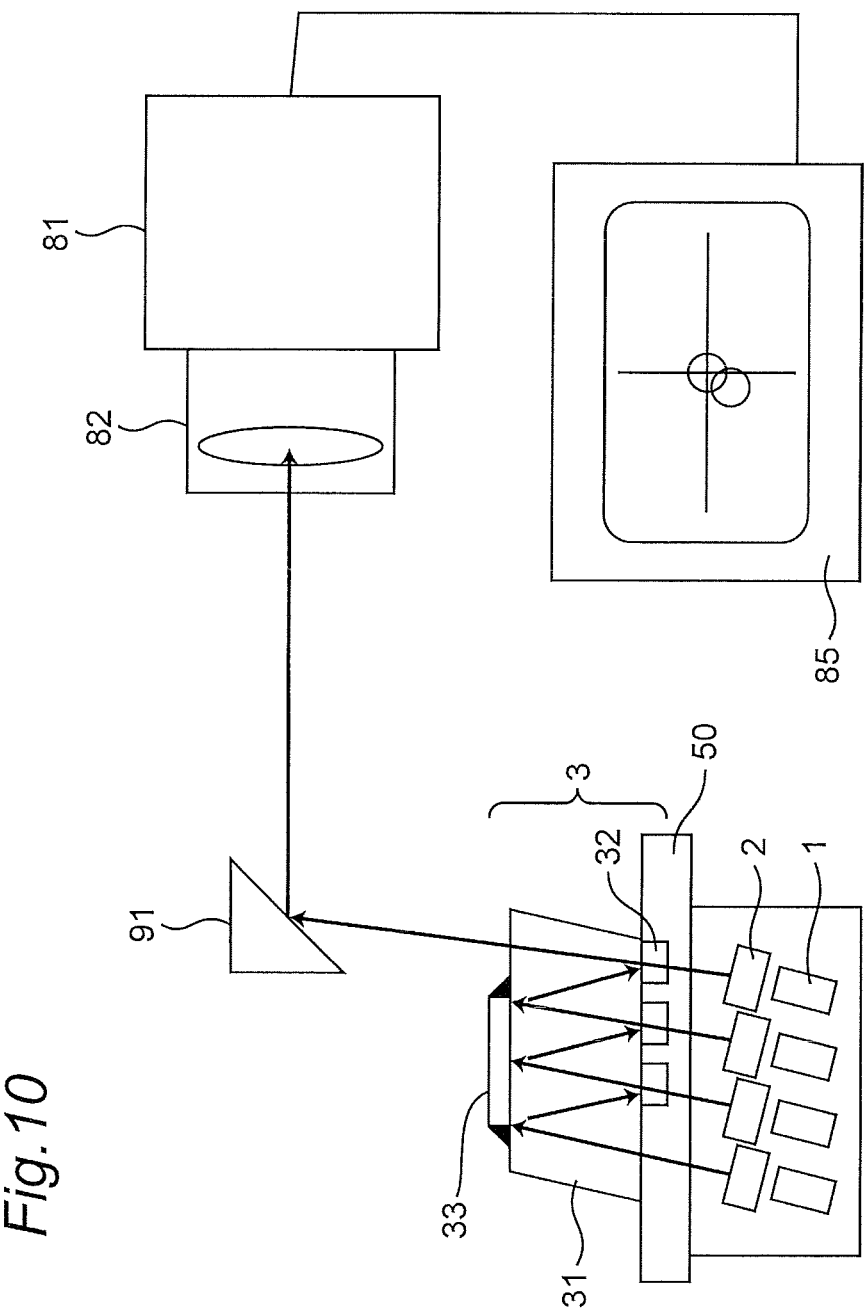
FIG. 10 is an explanatory view of another exemplary technique of surveying assembly accuracy of an optical multiplexer.

FIG. 10 is an explanatory view of another exemplary technique of surveying assembly accuracy of an optical multiplexer. FIG. 10 exemplifies a case of using a reference model of an optical integration module including four optical devices 1 and four lenses 2 in place of the reference light source 51. The optical multiplexer 3 is irradiated with four test light beams with use of such a reference model to enable individual specification of the optical filters 32 and the mirror 33 angularly misaligned. The optical component angularly misaligned has only to be corrected to save work time in this case.

As described above, the optical multiplexer 3 can be assembled highly accurately and accuracy of the completed optical multiplexer can easily be checked to obtain a small optical integration module causing less optical loss variation. In particular, there is required no task of adjusting the positions of the lenses again in accordance with the position of the optical multiplexer having been mounted. This achieves improvement in manufacture efficiency of the optical integration module and reduction in manufacture cost therefor.

Second Embodiment

Figure 11:
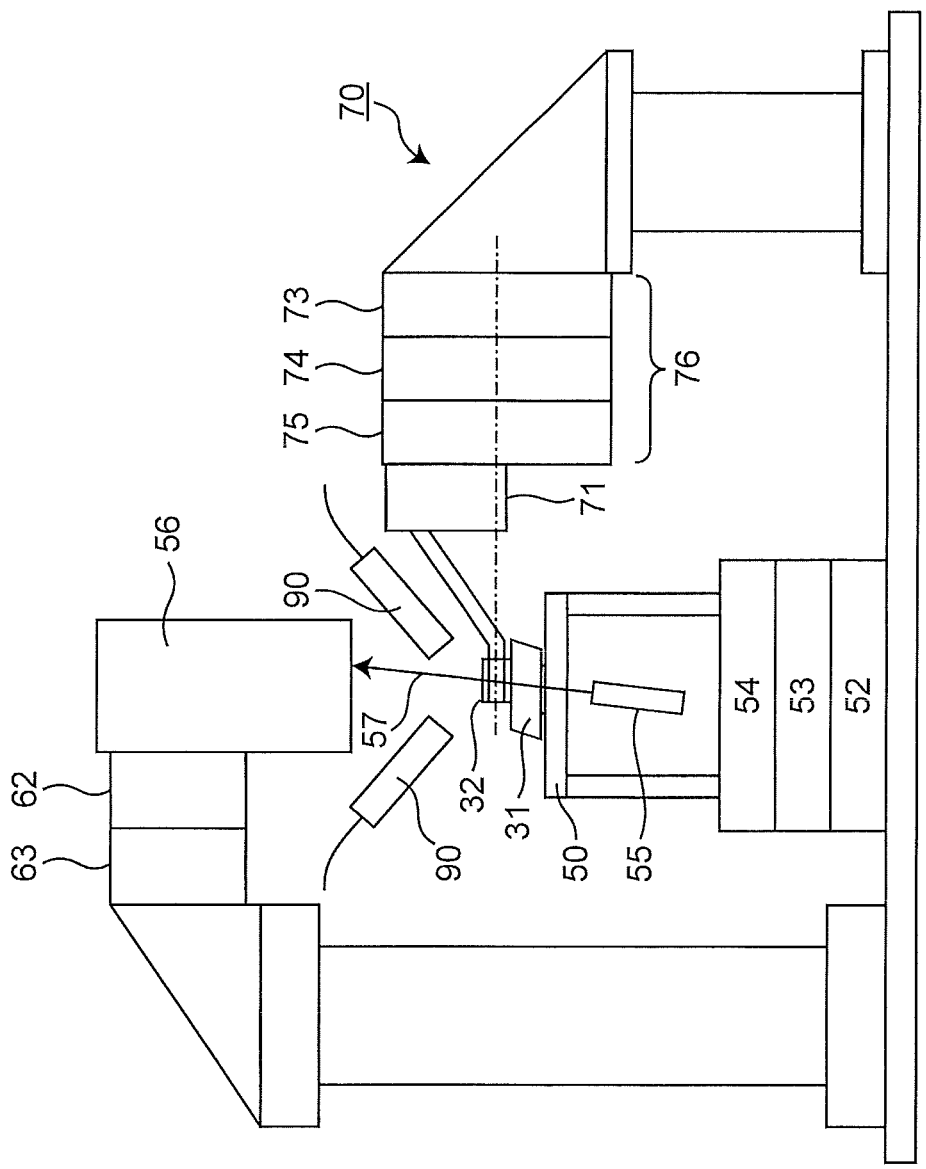
FIG. 11 is a front view of an exemplary apparatus configured to manufacture an optical multiplexer according a second embodiment of the present invention.

FIG. 11 is a front view of an exemplary apparatus configured to manufacture an optical multiplexer according the second embodiment of the present invention. The identical reference signs in FIGS. 5 and 11 denote identical or corresponding parts. The manufacturing apparatus depicted in FIG. 11 includes a wavelength variable light source 55 provided below the workpiece table 50. Light emitted from the wavelength variable light source 55 transmits through the substrate 31 and the like and enters a power meter 56 provided above the workpiece table 50 to have its intensity measured. The remaining parts are configured identically to those of the manufacturing apparatus depicted in FIG. 5.

An exemplary manufacturing method for the optical multiplexer according to the present second embodiment will be described below particularly in terms of differences from the measuring method according to the first embodiment, with reference to the flowchart in FIG. 6, exemplifying the manufacturing method for the optical multiplexer according to the first embodiment.

Initially in step s1, similarly to the method according to the first embodiment, the mirror 33 is fixed to the substrate 31 in a state where the angle θa of the reference surface of the workpiece table 50 and the angle θb of the mirror 33 are equal to each other with use of the manufacturing apparatus depicted in FIG. 5 or the like.

Subsequently in step s2 of adjusting the angles of the optical filters 32, the imaging camera 81 receives light from the light beam irradiation angle measuring unit 60 such as the autocollimator depicted in FIG. 5 or light from the reference light source 51 depicted in FIG. 8 to survey an angle of collimate beams in the first embodiment. In the present second embodiment, the optical filters 32 are angularly adjusted with use of the wavelength variable light source 55 and the power meter 56 as depicted in FIG. 11.

The optical filters 32 each have a property of allowing only a laser beam of a specific wavelength to transmit therethrough. The laser beam of the specific wavelength has transmittance changing in accordance with an incident angle of the laser beam to each of the optical filters 32. The present second embodiment utilizes the property of the optical filters 32 to change the wavelength of light emitted from the wavelength variable light source 55 to be equal to the wavelengths of light emitted from the optical devices 1.

Each of the optical filters 32 is angularly adjusted to maximize intensity of passing light having the wavelength from a corresponding one of the optical devices 1, and is then fixed to the substrate 31.

Figure 12:
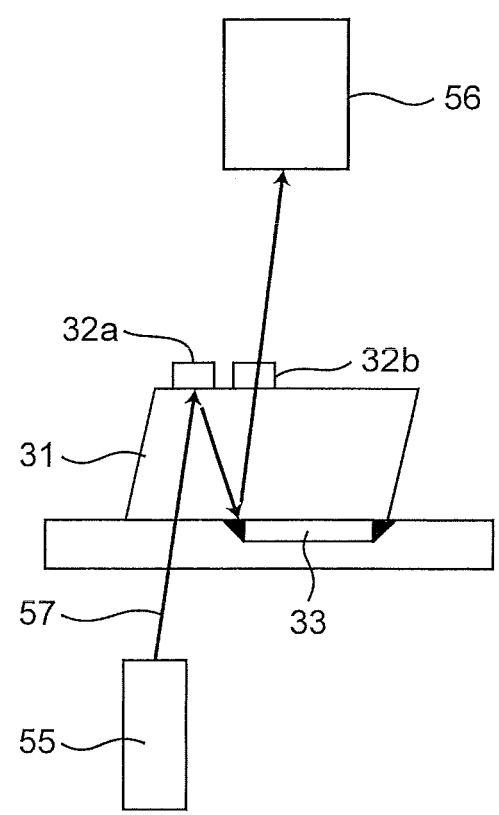
FIG. 12 is an explanatory view of angular measurement of an optical filter with test light according to the second embodiment of the present invention.

FIG. 12 depicts angular adjustment of an optical filter 32b in step s2. It is assumed that an optical filter 32a is already angularly adjusted and fixed to the substrate 31.

In this step, the wavelength variable light source 55 sets test light 57 to have a wavelength so as to be reflected at the optical filter 32a and transmit through the optical filter 32b. The power meter 56 measures optical intensity of the test light 57 having transmitted through the optical filter 32b. Angular adjustment of the optical filter 32b to change an incident angle of the test light 57 to the optical filter 32b causes change in optical intensity of the test light 57 transmitting through the optical filter 32b and measured by the power meter 56. The optical filter 32b is angularly adjusted to maximize optical intensity detected by the power meter 56 and is then fixed to the substrate 31 in this state.

In a step of angularly adjusting another adjacent optical filter, the test light 57 is set to have a wavelength so as to be reflected at the optical filters 32a and 32b and transmit through only the adjacent optical filter, which is angularly adjusted and fixed through a similar step.

Subsequently in step s3, similarly to the method according to the first embodiment, the optical multiplexer is irradiated with a test light beam for survey of assembly accuracy of the optical multiplexer to complete the optical multiplexer.

As described above, the step of assembling the optical multiplexer 3 according to the present second embodiment includes angularly adjusting the optical filters 32 respectively corresponding to the optical devices 1 to achieve maximum transmission of light having wavelengths from the optical devices 1, and fixing the optical filters 32 to the substrate 31, for manufacture of the optical multiplexer 3 causing less optical loss.

DESCRIPTION OF REFERENCE SYMBOLS

1 Optical device
2 Lens
3 Optical multiplexer
4 Basal plate
6 Zoom lens
7 Imaging camera
31 Substrate
32 Optical filter
33 Mirror
34 Adhesive agent
38 Window
50 Workpiece table
51 Reference light source
52 XY axis stage
53 Rotary stage
54 Biaxial gonio stage
55 Wavelength variable light source
56 Power meter
57 Test light
60 Light beam irradiation angle measuring unit
61 Autocollimator
62 Rotary stage
63 Z axis stage
70 Angle adjuster
71 Component gripping mechanism
72 Gripping hand
73 Z axis stage 74 Rotary stage
75 Biaxial gonio stage
80 Imaging camera unit
81 Imaging camera
82 Imaging lens
83 XY axis stage
84 Z axis stage
90 Light guide
91 Mirror

The invention claimed is:

1. A method of manufacturing an optical multiplexer including
a substrate having a first main surface and a second main surface parallel to each other,
a mirror disposed on the first main surface, and
an optical filter disposed on the second main surface,
the method comprising the steps of:
mounting the substrate on a workpiece table;
mounting the mirror on the first main surface of the substrate, angularly adjusting the mirror with respect to the substrate with use of an autocollimator, and then fixing the mirror to the substrate;
inverting the substrate on the workpiece table; and
mounting the optical filter on the second main surface of the substrate, angularly adjusting the optical filter with respect to the substrate with use of the autocollimator, and then fixing the optical filter to the substrate.

2. The method of manufacturing the optical multiplexer according to claim 1, further comprising the step of irradiating the obtained optical multiplexer with a test light beam and positionally measuring a light beam outputted from the optical multiplexer.

* * * * *